(12) United States Patent
Uesugi

(10) Patent No.: US 6,314,304 B1
(45) Date of Patent: Nov. 6, 2001

(54) MOBILE COMMUNICATION SYSTEM WITH IMPROVED ANTENNA ARRANGEMENT

(75) Inventor: Mitsuru Uesugi, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 08/887,048

(22) Filed: Jul. 2, 1997

(30) Foreign Application Priority Data

Jul. 2, 1996 (JP) .................................................. 8-189906

(51) Int. Cl.$^7$ .............................. H04Q 7/20; H04Q 7/30; H04Q 7/32
(52) U.S. Cl. .......................... 455/562; 455/561; 455/550; 455/517; 455/524; 455/525; 455/63; 455/67.3
(58) Field of Search ..................................... 455/562, 561, 455/550, 447, 445, 454, 11.1, 517, 524, 525, 63, 67.3, 226.3

(56) References Cited

U.S. PATENT DOCUMENTS

| | | | |
|---|---|---|---|
| 5,247,699 | * 9/1993 | Hartman | 455/562 |
| 5,307,507 | 4/1994 | Kanai | 455/562 |
| 5,485,631 | 1/1996 | Bruckert | 455/562 |
| 5,504,936 | * 4/1996 | Lee | 455/562 |
| 5,596,333 | * 1/1997 | Bruckert | 455/562 |
| 5,742,911 | * 4/1998 | Dumbrill et al. | 455/562 |
| 5,828,944 | * 10/1998 | Uppaluri et al. | 455/562 |
| 5,848,358 | * 12/1998 | Forssen et al. | 455/562 |

FOREIGN PATENT DOCUMENTS

| | | |
|---|---|---|
| 2438389 | 4/1980 | (FR) . |
| 3-37336 | 6/1991 | (JP) . |
| 4-11419 | 1/1992 | (JP) . |
| 9107043 | 5/1991 | (WO) . |
| 9312586 | 6/1993 | (WO) . |
| 9606510 | 2/1996 | (WO) . |

* cited by examiner

Primary Examiner—William Trost
Assistant Examiner—Keith Ferguson
(74) Attorney, Agent, or Firm—Israel Gopstein

(57) ABSTRACT

An improved antenna arrangement for use in a cellular telecommunication system is provided. A plurality of antennas which are connected to a common base station are located on the periphery of a radio zone or cell. Each of the antennas has a directional characteristic oriented toward the center of the cell to cover the inside of the cell. This antenna arrangement minimizes the co-channel interference, thereby allowing the distance between cells to which the same channel is assigned to be shortened.

10 Claims, 11 Drawing Sheets

US 6,314,304 B1

MOBILE COMMUNICATION SYSTEM WITH IMPROVED ANTENNA ARRANGEMENT

BACKGROUND OF THE INVENTION

1. Technical Field

The present invention relates generally to a mobile communication system using, for example, TDMA (Time-Division Multiple-Access) or FDMA (Frequency-Division Multiple-Access) technique, and more particularly to an improved antenna arrangement for use in cellular radiotelephone communication systems which is designed to reduce the co-channel interference for shortening the distance between radio zones or cells to which the same frequency is assigned for improvement of the spectrum efficiency.

2. Background of Related Art

In conventional cellular radiotelephone communication systems, an omnidirectional antenna or several directional antennas are disposed in a base station to define a circular radio zone or cell. In a TDMA or FDMA system, transmission of a plurality of radio signals at the same frequency will induce the co-channel interference, resulting in a failure in data transmission.

FIG. 21 shows one example of conventional zone layout. Each hexagonal cell has disposed centrally a base station. A number labeled in each cell indicates the frequency. The cells of the same number are assigned the same frequency. In this frequency reuse pattern, reduction in co-channel interference is achieved by increasing the distance between the cells to which the same frequency is assigned. This, however, decreases the spectrum efficiency, thereby resulting in a difficulty in increasing the capacity of telephone subscribers.

In order to avoid the above problem, Japanese Patent Second Publication No. 3-37336 teaches a cellular telecommunication system using the sector layout as shown in FIG. 22.

A cell is divided into six sectors 1 to 6 surrounding a base station 7. Six directional antennas each covering a fan-shaped part of the cell are disposed on the base station. An increase in frequency reuse is achieved without lowering the DU (desired signal to undesired signal) ratio by assigning the same frequency group to any two of the antennas oriented in opposite directions. For example, the same frequency group F1 is assigned to the sectors 1 and 4. The same frequency group F2 is assigned to the sectors 2 and 5. The same frequency group F3 is assigned to the sectors 3 and 6. This frequency reuse will cause, for example, the sector 1 to experience the co-channel interference with a radio signal from the sector 4 which uses the same frequency channel and is diametrically opposed to the sector 1. A radio signal radiated from the sector 1 to sector 4, however, has a level that is decreased by a front-to-back (F/B) ratio (i.e., ratio of signal strength transmitted in a forward direction to that transmitted in a backward direction). Typical antennas show a F/B ratio of 25 dB or more.

The above prior art communication system having the antennas disposed at the center of the cell, however, encounters the difficulty in improving the spectrum efficiency for the following reasons.

UPLINK SIGNAL

A mobile station lying at an end of the cell is closer to an adjacent cell than any other mobile stations lying inside the end of the cell and has the greatest transmission power. The proximity to an adjacent cell will cause the interference to be maximized. It is thus necessary to design a circuitry taking into account the case where a mobile station lies at the end of the cell.

DOWNLINK SIGNAL

A mobile station lying at an end of the cell is most apart from the base station, and the level of a desired frequency is lowest. Additionally, the mobile station undergoes the greatest interference with a ratio signal radiated from another cell. This, likewise to the above, requires the design of a circuitry taking into account the case where a mobile station lies at the end of the cell.

Specifically, the above problem is inevitably encountered regardless of any cell layouts as long as a base station is centrally located in a cell.

SUMMARY OF THE INVENTION

It is therefore a principal object of the present invention to avoid the disadvantages of the prior art.

It is another object of the present invention to provide an improved antenna arrangement capable of reducing the co-channel interference, thereby allowing the distance between cells to which the same channel is assigned to be decreased.

According to one aspect of the present invention, there is provided a mobile communication system which comprises a base station and a plurality of antennas connected to the base station. The antennas are located on a periphery of a cell and have directional characteristics oriented toward the center of the cell.

In the preferred mode of the invention, each of the antennas has the directional characteristic oriented to cover 120° area of the cell. The antennas are located at angular intervals of 120°.

The antennas may alternatively have the directional characteristics oriented to cover 120° areas of the cell, respectively, and are located at angular intervals of 60°. An omnidirectional antenna may be located at the center of the cell.

The number of the antennas may be three, one of which is a central antenna having the directional characteristic covering a 60° area of the cell and the others each have the directional characteristic covering a 120° area of the cell and are located on both sides of the central antenna. The central antenna may alternatively have the directional characteristic covering a 120° area of the cell. Each of the antennas on the both sides of the central antenna may alternatively have the directional characteristic covering a 60° area of the cell.

The base station has a diversity circuit which performs a selection diversity operation on radio signals received by the antennas to provide a resultant signal.

The diversity circuit may alternatively perform an equal-gain combining diversity operation on radio signals received by the antennas to provide a resultant signal or a maximal-ratio combining diversity operation on the radio signals received by the antennas to provide a resultant signal.

The base station may have a decision feedback equalizer which removes components inducing co-channel interference from signal received by the antennas. A tap interval of the decision feedback equalizer is set to a fraction of a symbol cycle for minimizing effects caused by a difference in arrival time of the signals at the antennas.

The base station may have a decoder which performs a maximum likelihood sequence estimation to minimize distortion caused by a difference in arrival time of the signals at the antennas.

A mobile station which has a decision feedback equalizer is further provided. A tap interval of the decision feedback equalizer of the mobile station is set to a fraction of a symbol cycle for minimizing effects caused by a difference in arrival time of signals from the antennas at the mobile station.

The mobile station may have a decoder designed to perform a maximum likelihood sequence estimation to minimize distortion caused by a difference in arrival time of the signals from the antennas at the mobile station.

The mobile station has a plurality of antennas and a diversity circuit performing a given diversity operation on the signals received by the antennas. The mobile station has a decision feedback equalizer and a decoder performing a maximum likelihood sequence estimation operation.

The mobile station may have an adaptive array of antennas, a decision feedback equalizer and a decoder performing a maximum likelihood sequence estimation operation.

The base station may include a power monitor and a handover control circuit. The power monitor monitors powers of the signals received by the antennas to determine a position of a mobile station within the cell. The handover control circuit performs handover based on the position of the mobile station determined by the power monitor.

The station may alternatively include a channel estimating circuit and a diversity circuit. The channel estimating circuit estimates a channel state by adjusting an uplink signal frequency and a downlink signal frequency to agree with each other. The diversity circuit adds reverse characteristics to the estimated channel state to a transmitting signal.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 1(*b*) is a schematic diagram which illustrates downlink signal transmission within a radio zone defined by the antenna arrangement according to the first embodiment of the invention;

FIG. 3(*b*) is a schematic diagram which illustrates a conventional frequency reuse pattern;

DESCRIPTION OF THE PREFERRED EMBODIMENT

Figure 1A:
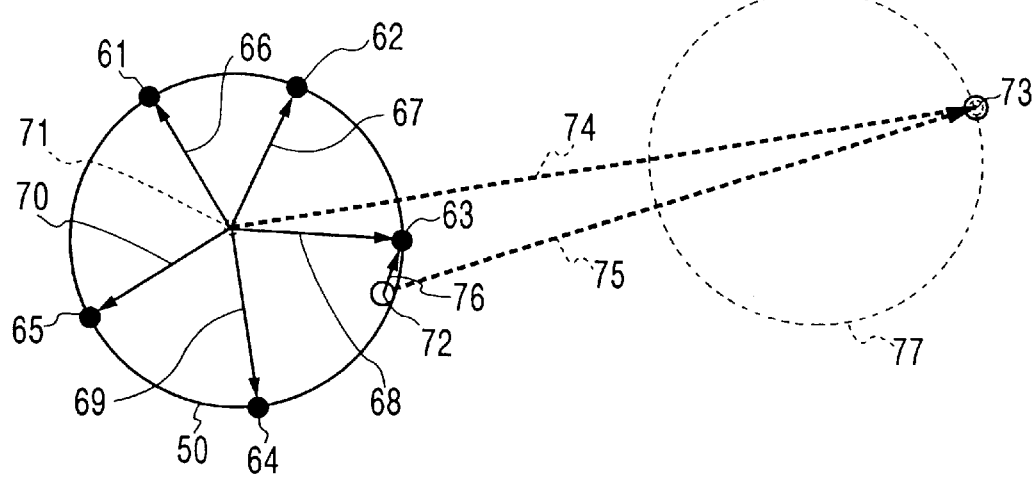
FIG. 1(*a*) is a schematic diagram which illustrates uplink signal transmission within a radio zone defined by the antenna arrangement according to the first embodiment of the invention.

Referring now to the drawings, particularly to FIGS. 1(*a*) and 1(*b*), there are shown an antenna arrangement of a mobile communication system such as a cellular radiotelephone communication system according to the first embodiment of the invention. FIG. 1(*a*) shows uplink signal transmission. FIG. 1(*b*) shows downlink signal transmission.

In FIG. 1(*a*), antennas 61, 62, 63, 64, and 65 are connected to a common base station in a cell 50. Each of the antennas is a directional antenna having a directional characteristic oriented to the center of the cell 50. The antennas 61 to 65 receive uplink signals 66, 67, 68, 69, 70, and 76 outputted from mobile stations 71 and 72, respectively. An adjacent cell 77 has the same antenna arrangement as that in the cell 50, but only an antenna 73 receiving interference waves 74 and 75 from the mobile stations 71 and 72 is shown for the brevity of illustration.

In FIG. 1(*b*), antennas 81, 82, 83, 84, and 85 are connected to a common base station within a cell 55. Each of the antennas 81 to 85 has a directional characteristic oriented to the center of the cell 55. The antennas 81 to 85 transmit downlink signals 86, 87, 88, 89, 90, and 96 to mobile stations 91 and 92, respectively. An adjacent cell 97 has the same antenna arrangement as that in the cell 55, but only an antenna 93 radiating interference waves 94 and 95 toward the mobile stations 91 and 92 is shown for the brevity of illustration.

In operation, when the mobile station 71 emits a signal through an omnidirectional antenna, it is received by the five antennas 61 to 65 as shown in FIG. 1(a) and then demodulated in the base station. Since the mobile station 71 lies near the center of the cell 50, the base station receives the uplink signals 66 to 70 at substantially the same average level.

When the selection diversity is used in the base station of the cell 50, the mobile station 71 is required to output a signal at a high power because the antennas 61 to 65 are all distant from the mobile station 71. However, since the mobile station 71 is at a location near the center of the cell 50 away from the antenna 73 having the directivity oriented toward the mobile station 71, and the antenna 73 is located at a greater distance from the mobile station 71 than any other antenna located in the cell 77, the co-channel interference at the antenna 73 is reduced. This allows the distance between the cells 50 and 77 to be decreased as compared with that in a conventional cellular telecommunication system.

When the combining diversity is used in the base station of the cell 50, powers of all the antennas 61 to 65 are combined, thus allowing a transmission power of the mobile station 71 to be lowered.

When the mobile station 72 lying near the end or periphery of the cell 50 transmits a signal through an omnidirectional antenna, it is received by all the antennas 61 to 65, but by the nearest antenna 63 at the highest level. Specifically, the mobile station 72 can transmit a signal at a decreased power regardless of whether the base station employs the selection diversity or the combining diversity.

In a conventional cellular telecommunication system, a mobile station is required to transmit a signal at higher power as it moves to the end of a cell, however, the antenna arrangement of this embodiment makes it possible to decrease the transmission power of a mobile station as it moves to the end of a cell. This results in a decrease in interference wave 75. The antenna 73 having the directional characteristic oriented toward the mobile 72 is, as discussed above, located at a greater distance from the mobile station 71 than any other antenna located in the cell 77, thereby allowing the distance between the cells 50 and 77 to be shortened as compared with the conventional cellular telecommunication system. This embodiment, therefore, improves the spectrum efficiency greatly.

Figure 1B:
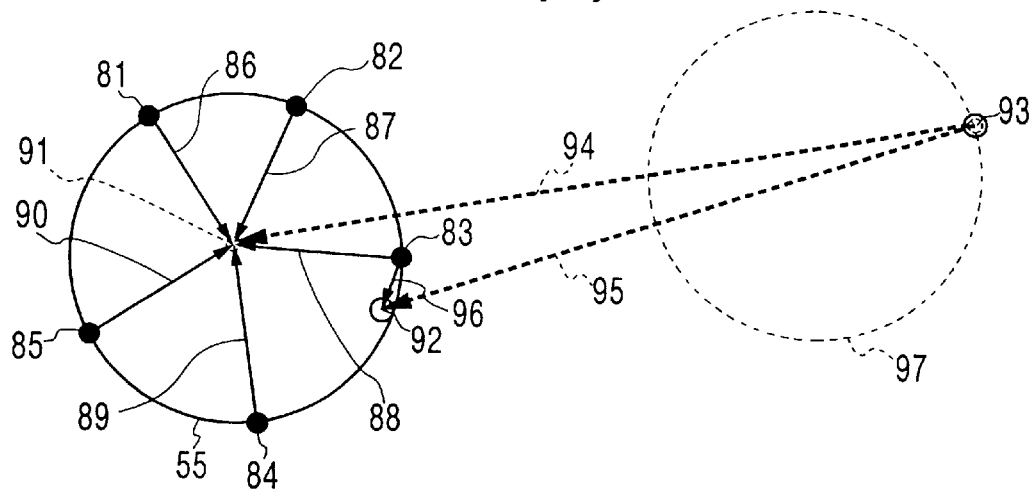

In FIG. 1(b), the mobile station 91 receives at an omnidirectional antenna the downlink signals 86 to 90 transmitted from the base station within the cell 55 through the antennas 81 to 85. Since the mobile station 91 is near the center of the cell 55, it receives the downlink signals 86 to 90 at substantially the same average level.

The mobile station 91 is away from all the antennas 81 to 85 so that the levels of the downlink signals 86 to 90 are all low, but they are combined in the mobile station 91 to provide a sufficient reception level. The mobile station 91 lies near the center of the cell 55, that is, is distant from the adjacent cell 97 so that the co-channel interference is decreased. The mobile station 92 lying at the end of the cell 55 receives the downlink signal 96 from the nearest antenna 83 at the highest level. The antenna 93 having the directional characteristic oriented toward the mobile station 92 within the adjacent cell 97 is at the greatest distance from the mobile station 92 among other antennas within the cell 97 so that the co-channel interference is decreased.

In a conventional cellular telecommunication system, a mobile station is required to transmit a signal at higher power as it moves to the end of a cell, however, the antenna arrangement of this embodiment makes it possible to decrease the transmission power of a mobile station as it moves to the end of a cell. This results in a decrease in interference wave 95 which greatly interferes with the downlink signal 96 received by the antenna 92. The antenna 93 having the directional characteristic oriented toward the mobile 92 is, as discussed above, located at a greater distance from the mobile 92 than any other antenna in the cell 97, thereby allowing the distance between the cells 70 and 97 to be shortened as compared with the conventional cellular telecommunication system. This embodiment, therefore, offers a great improvement in spectrum efficiency.

Figure 2:
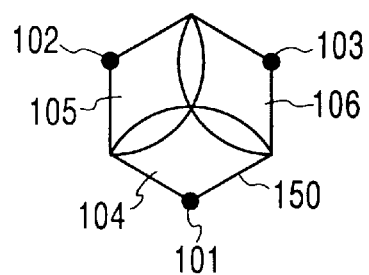
FIG. 2 is a schematic diagram which illustrates the antenna arrangement defining a radio zone according to the second embodiment of the invention.

FIG. 2 shows an antenna arrangement of the mobile communication system according to the second embodiment of the invention.

Antennas 101, 102, and 103 are connected to a common base station and located on the periphery of a hexagonal cell 150 at 120° angular intervals. The antennas 101 to 103 have directional characteristics covering 120° areas (i.e., sub-cells 104, 105, and 106) of the cell 150, respectively, so that they can cover the entire area of the cell 150.

Figure 3A:
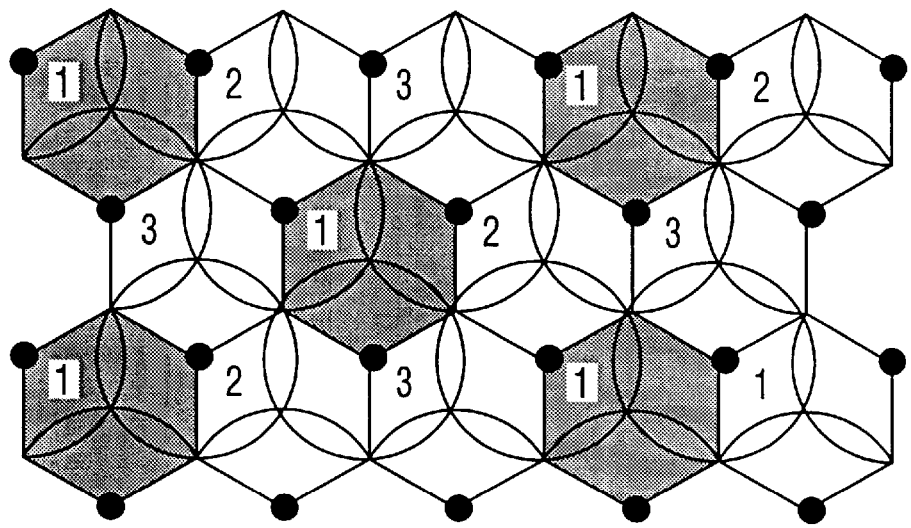
FIG. 3(*a*) is a schematic diagram which illustrates a frequency reuse pattern according to the second embodiment of the invention.
Figure 3B:
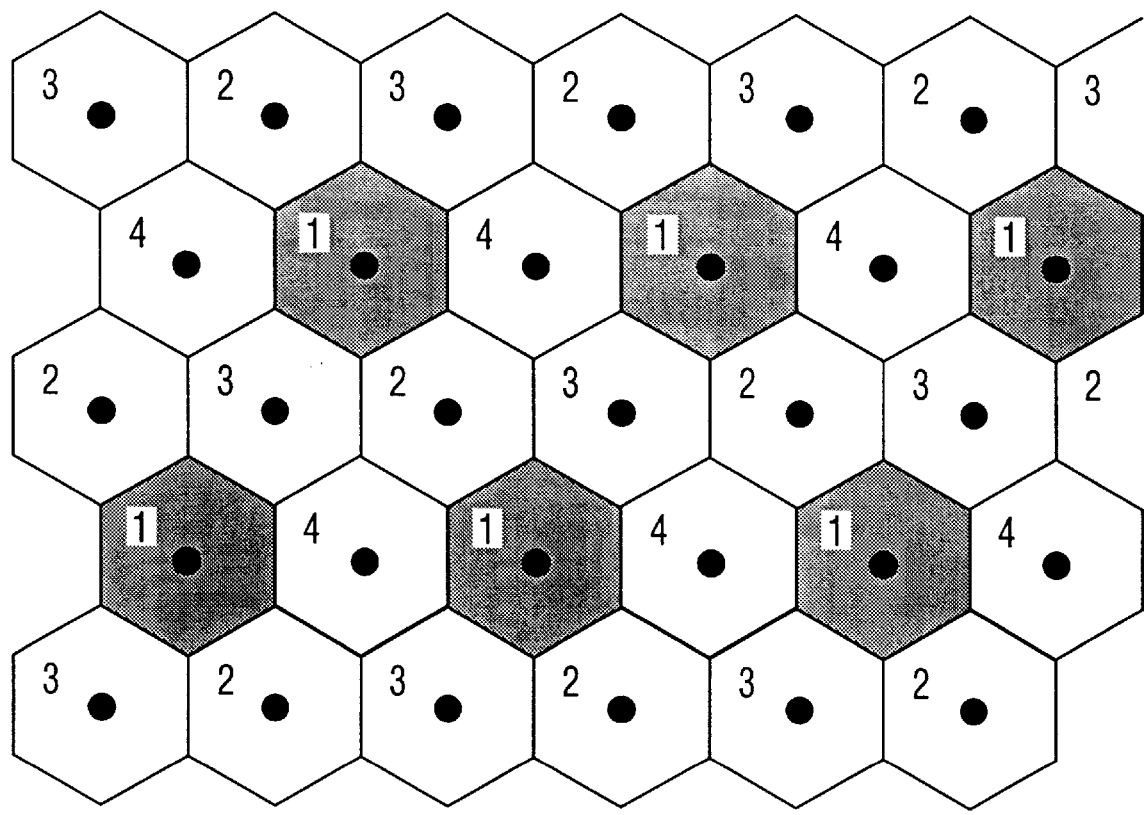

FIG. 3(a) shows a frequency reuse pattern using the antenna arrangement shown in FIG. 2. FIG. 3(b) shows a conventional frequency reuse pattern. A number in each cell shows the frequency assigned to it. For example, hatched cells use the same frequency. Back circles indicate antenna locations. In FIG. 3(a), antennas of three adjacent base stations are disposed at the same location.

As can be seen from the drawings, the system of this embodiment of FIG. 3(a) has a three cell reuse pattern, while the conventional system of FIG. 3(b) has a four cell reuse pattern. The antenna arrangement of this embodiment, therefore, makes it possible to decrease the distance between cells within which the same frequency channel can be used, thereby resulting in a 33% improvement in spectrum efficiency.

Figure 4:
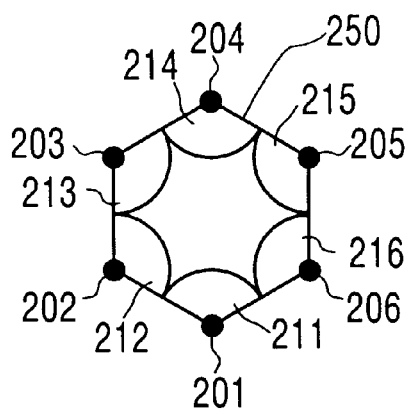
FIG. 4 is a schematic diagram which illustrates the antenna arrangement defining a radio zone according to the third embodiment of the invention.

FIG. 4 shows an antenna arrangement of the mobile communication system according to the third embodiment of the invention. For the sake of simplicity of illustration, only one cell is shown.

Antennas 201, 202, 203, 204, 205, and 206 are connected to a common base station and located on the periphery of a hexagonal cell 250 at 60° angular intervals. The antennas 201 to 206 have directional characteristics toward the center of the cell 250 and cover 120° areas, respectively. Specifically, the antennas 201 to 206 cover six fan-shaped areas 211 to 216 in the cell 250.

With this antenna arrangement, the center of the cell 250 is away from any of the antennas 201 to 206, but powers of signals transmitted form the six antennas 201 to 206 are summed at the center of the cell 250, thereby making it possible to receive downlink signals at the center of the cell 250 at sufficient levels. The shown antenna arrangement also decreases at the center of the cell 250 the levels of co-channel interference waves transmitted from adjacent cells as compared with those on the periphery of the cell 250, thereby allowing a mobile station lying at the center of the cell 250 to receive downlink signals at a decreased power.

The reception of an uplink signal from a mobile station is achieved by using the combining diversity to combine signals received by the antennas 201 to 206 even when the uplink signal is transmitted at a lower power.

The antenna arrangement of this embodiment allows a mobile station lying at the periphery of the cell as well as a base station to transmit signals at powers less than those in the second embodiment shown in FIG. 2, thereby resulting in improved quality of received signals and also allows the distance between cells to which the same frequency is assigned to be further decreased.

Figure 5:
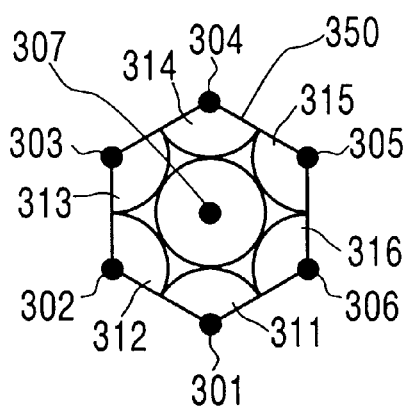
FIG. 5 is a schematic diagram which illustrates the antenna arrangement defining a radio zone according to the fourth embodiment of the invention.

FIG. 5 shows an antenna arrangement of the mobile communication system according to the fourth embodiment of the invention. For the sake of simplicity of illustration, only one cell is shown.

Antennas 301, 302, 303, 304, 305, 306, and 307 are connected to a common base station. The antennas 301 to 306 are located on the periphery of a hexagonal cell 350 at 60° angular intervals and have directional characteristics which are oriented to the center of the cell 350 and cover 120° areas of the cell 350, respectively. Specifically, the antennas 301 to 306 cover six fan-shaped areas 311 to 316 in the cell 350. The antenna 307 is an omnidirectional antenna and located at the center of the cell 350 to cover a circular area 317 inside the six fan-shaped areas 311 to 316. With this antenna arrangement, most of the cell 350 is covered by the antennas 301 to 307.

The antenna arrangement of this embodiment allows the distance between cells to which the same frequency is assigned to be shortened and a mobile station lying at the center of the cell 350 to transmit a signal at the power less than that in the third embodiment shown in FIG. 4 even if the base station uses the antenna switching diversity, thereby allowing the hardware of the base station to be reduced in size. This also allows the power consumption to be decreased at a mobile station so that the standby time and the talking time can be prolonged.

Figure 6:
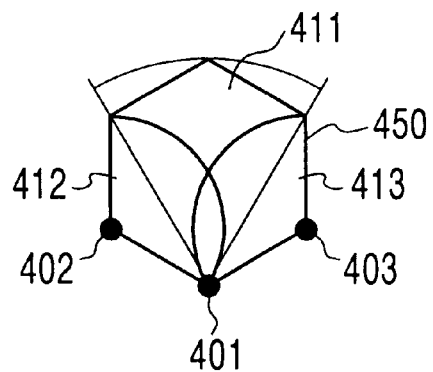
FIG. 6 is a schematic diagram which illustrates the antenna arrangement defining a radio zone according to the fifth embodiment of the invention.

FIG. 6 shows an antenna arrangement of the mobile communication system according to the fifth embodiment of the invention. For the sake of simplicity of illustration, only one cell is shown.

Antenna 401, 402, and 403 are connected to a common base station and located on adjacent three of vertexes of a hexagonal cell 450. The antennas 402 and 403 cover 120° areas 412 and 413 within the cell 450, respectively. The antenna 401 is arranged between the antennas 402 and 403 and covers a 60° area 411 across the center of the cell 450.

With this antenna arrangement, the same effects as those of the above embodiments are obtained using less antennas.

Figure 7:
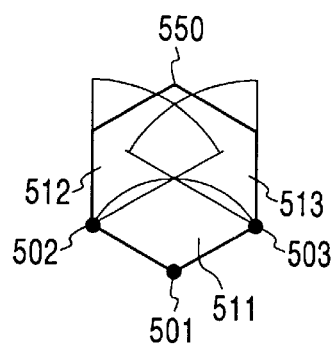
FIG. 7 is a schematic diagram which illustrates the antenna arrangement defining a radio zone according to the sixth embodiment of the invention.

FIG. 7 shows an antenna arrangement of the mobile communication system according to the sixth embodiment of the invention which is a modification of the fifth embodiment in FIG. 6. For the sake of simplicity of illustration, only one cell is shown.

Antenna 501, 502, and 503 are connected to a common base station and located on adjacent three of vertexes of a hexagonal cell 550. The antennas 502 and 503 cover 60° areas 512 and 513 within the cell 550 each of which expands from one side of the hexagon to the center of the cell 550. The antenna 501 is arranged between the antennas 502 and 503 and covers a 60° area 511 between adjacent two of the vertexes of the hexagon 550.

The antenna arrangement of this embodiment, similar to the above fifth embodiment, allows the distance between adjacent two of the antennas 501 to 503 to be shortened as compared with that in the second embodiment shown in FIG. 2, thereby allowing connecting cables to be shortened. Additionally, the antenna arrangement also allows a required maximum transmitting power to be decreased as compared with the fifth embodiment. Specifically, the transmitting powers of the antenna 401, as shown in FIG. 6, and a mobile station within the area 411 covered by the antenna 401 are greater than those in this embodiment. The antenna arrangement of this embodiment reduces the co-channel interference further.

Figure 8:
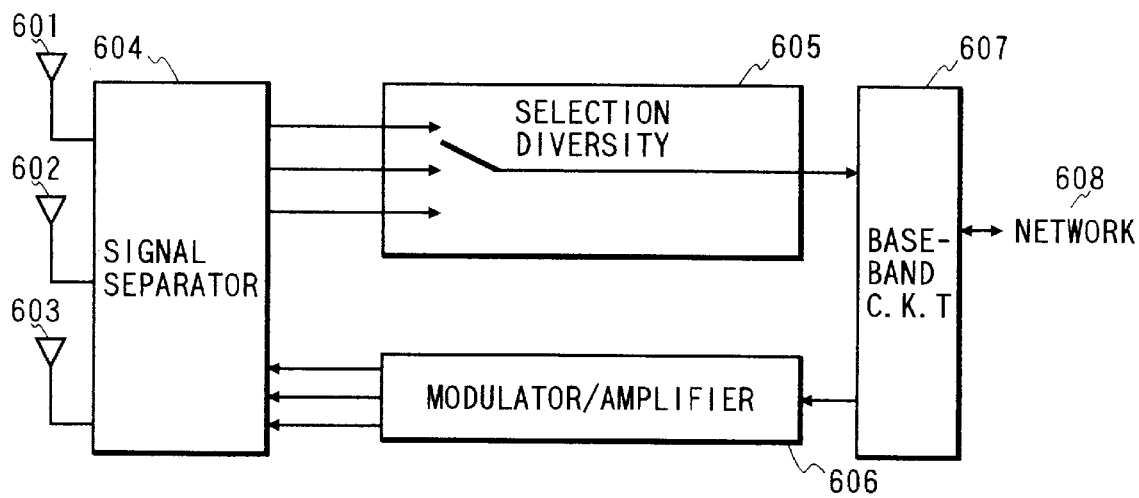
FIG. 8 is a circuit diagram which shows a base station according to the seventh embodiment of the invention.

FIG. 8 shows a circuit structure of a base station according to the seventh embodiment of the invention.

The base station includes a signal separating circuit 604, a selection diversity circuit 605, a baseband circuit 607, and a modulator/amplifier 606. The signal separating circuit 604 separates input signals into received signals and transmitting signals and supplies the received signals to the selection diversity circuit 605 and the transmitting signals to antennas 601, 602, and 603. This embodiment, as clearly shown in the drawing, uses the three antennas 601 to 603, but may alternatively use more than three antennas in any of the antenna arrangements, as discussed in the above first to sixth embodiments.

In operation, an uplink signal from a mobile station is received by the antennas 601 to 603 and then supplied to the selection diversity circuit 605 through the signal separating circuit 604. The selection diversity circuit 605 selects the greatest in level of signals received by the antennas 601 to 603 and supplies it to the baseband circuit 607. The baseband circuit 607 demodulates the input and transmits it as received data to the network 608.

A downlink signal from the network 608 is inputted to the modulator/amplifier 606. The modulator/amplifier 606 modulates the input signal and provides transmitting signals to the antennas 601 to 603 through the signal separating circuit 604, respectively.

Figure 9:
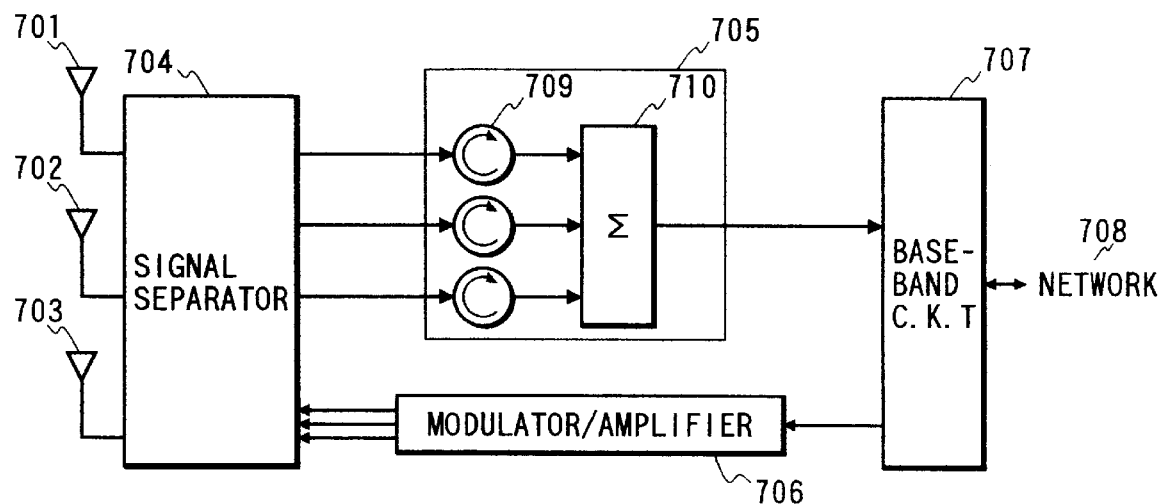
FIG. 9 is a circuit diagram which shows a base station according to the eighth embodiment of the invention.

FIG. 9 shows a circuit structure of a base station according to the eighth embodiment of the invention.

The base station includes an signal separating circuit 704, an equal-gain combining diversity circuit 705, a baseband circuit 707, and a modulator/amplifier 706. The signal separating circuit 704 separates input signals into received signals and transmitting signals and supplies the received signals to the equal-gain combining diversity circuit 705 and the transmitting signals to antennas 701, 702, and 703. The equal-gain combining diversity circuit 705 includes phase shifters 709 and an adder 710. This embodiment also uses the three antennas 701 to 703, but may alternatively use more than three antennas in any of the antenna arrangements, as discussed in the above first to sixth embodiments.

In operation, an uplink signal from a mobile station is received by the antennas 701 to 703 and then supplied to the equal-gain combining diversity circuit 705 through the signal separating circuit 704. The equal-gain combining diversity circuit 705 adjusts through the phase shifters 709 the phases of three signals received by the antennas 701 to 702 to agree with each other and adds them through the adder 710 for improvement in S/N ratio. The baseband circuit 707 demodulates the input from the equal-gain combining diversity circuit 705 and transmits it as received data to the network 708.

A downlink signal from the network 708 is inputted to the modulator/amplifier 706 and then modulated to produce three transmitting signals. The transmitting signals are supplied through the signal separating circuit 704 to the antennas 701 to 703.

Figure 10:
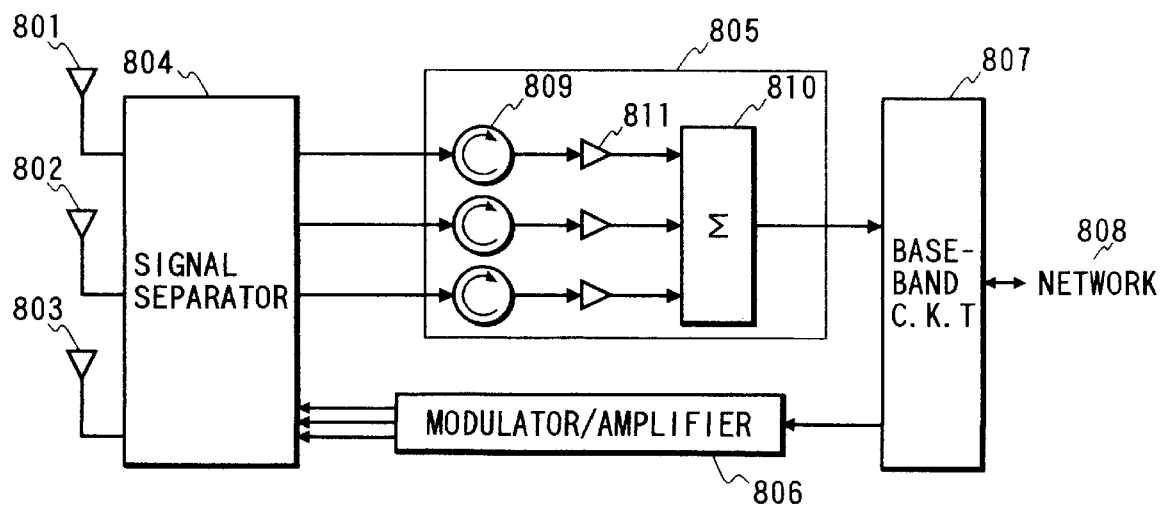
FIG. 10 is a circuit diagram which shows a base station according to the ninth embodiment of the invention.

FIG. 10 shows a circuit structure of a base station according to the ninth embodiment of the invention.

The base station includes an signal separating circuit 804, a maximal-ratio combining diversity circuit 805, a baseband circuit 807, and a modulator/amplifier 806. The signal separating circuit 804 separates input signals into received signals and transmitting signals and supplies the received signals to the maximal-ratio combining diversity circuit 805 and the transmitting signals to antennas 801, 802, and 803. The maximal-ratio combining diversity circuit 805 includes phase shifters 809, gain controllers 811 (i.e., weighting circuits), and an adder 810. This embodiment also uses the three antennas 801 to 803, but may alternatively use more than three antennas in any of the antenna arrangements, as discussed in the above first to sixth embodiments.

In operation, an uplink signal from a mobile station is received by the antennas 801 to 803 and then supplied to the maximal-ratio combining diversity circuit 805 through the signal separating circuit 804. The maximal-ratio combining diversity circuit 805 adjusts the phases of three signals received by the antennas 801 to 802 to agree with each other through the phase shifters 809, multiplies them by gains which are proportional to the levels of the received signals, respectively, through the gain controllers 811, and adds them through the adder 810 for improvement in S/N ratio. The baseband circuit 807 demodulates the input from the maximal-ratio combining diversity circuit 805 and transmits it as received data to the network 808.

A downlink signal from the network 808 is inputted to the modulator/amplifier 806 and then modulated to produce three transmitting signals. The transmitting signals are radiated from the antennas 801 to 803 through the signal separating circuit 804.

Figure 11:
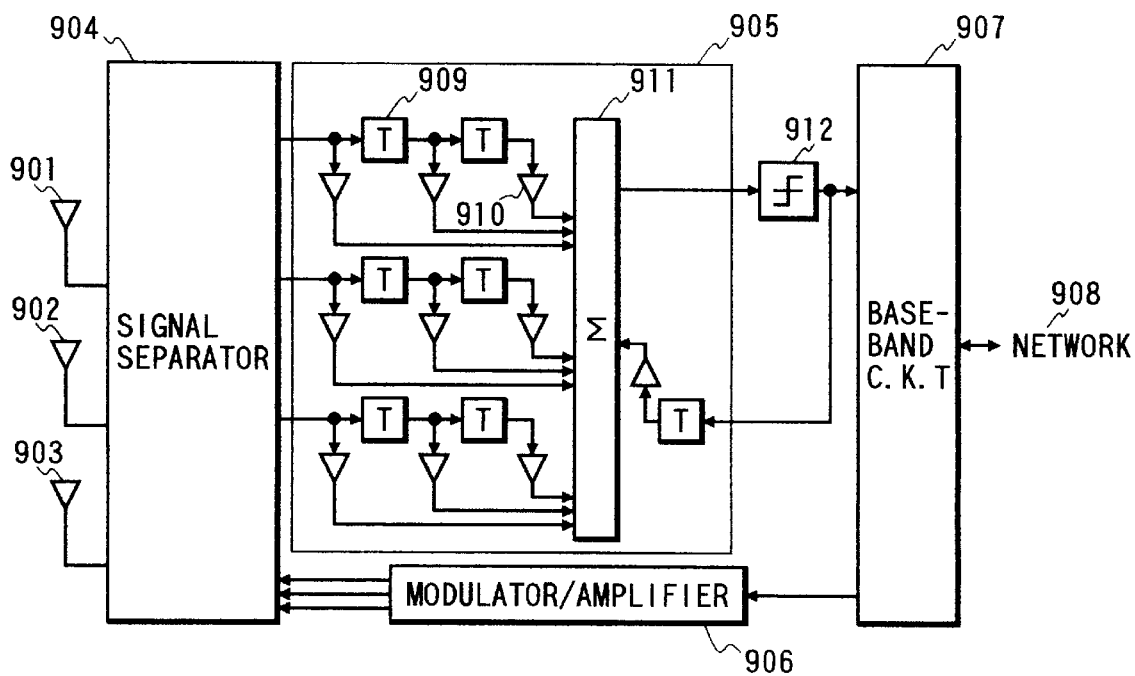
FIG. 11 is a circuit diagram which shows a base station according to the tenth embodiment of the invention.

FIG. 11 shows a circuit structure of a base station according to the tenth embodiment of the invention.

The base station includes an signal separating circuit 904, a decision feedback equalizer 905, a discriminator 912, a baseband circuit 907, and a modulator/amplifier 906. The signal separating circuit 904 separates input signals into received signals and transmitting signals and supplies the received signals to the decision feedback equalizer 905 and the transmitting signals to antennas 901, 902, and 903. The decision feedback equalizer 905 includes symbol interval delay circuits 909, gain controllers 910, and an adder 911. This embodiment also uses the three antennas 901 to 903, but may alternatively use more than three antennas in any of the antenna arrangements, as discussed in the above first to sixth embodiments.

In operation, an uplink signal from a mobile station is received by the antennas 901 to 903 and then supplied to the decision feedback equalizer 905 through the signal separating circuit 904. The decision feedback equalizer 905 removes from input signals components which would induce the intersymbol interference caused by the difference in distance between the antennas 901 to 903 and/or a delayed wave produced by diffraction or reflection of a radio signal on buildings or mountains and outputs them to the discriminator 912 through the adder 911. The discriminator 912 logically discriminates the output from the decision feedback equalizer 905 and supplies it to the network 908 through the baseband circuit 907.

A downlink signals from the network 908 is inputted to the modulator/amplifier 906 through the baseband circuit 907 and then radiated from the antennas 901 to 903 through the signal separating circuit 904.

Figure 12:
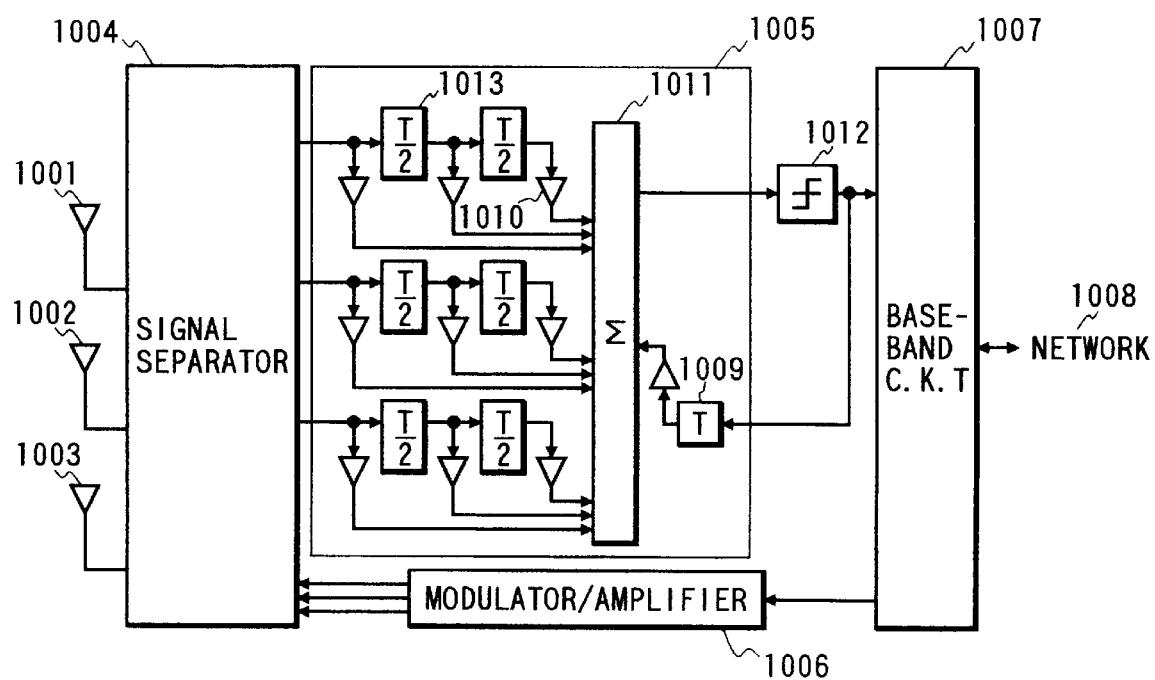
FIG. 12 is a circuit diagram which shows a base station according to the eleventh embodiment of the invention.

FIG. 12 shows a circuit structure of a base station according to the eleventh embodiment of the invention.

The base station includes an signal separating circuit 1004, a fraction interval decision feedback equalizer 1005, a discriminator 1012, a baseband circuit 1007, and a modulator/amplifier 1006. The signal separating circuit 1004 separates input signals into received signals and transmitting signals and supplies the received signals to the fractional spaced decision feedback equalizer 1005 and the transmitting signals to antennas 1001, 1002, and 1003.

The fractional spaced decision feedback equalizer 1005 includes a symbol interval delay circuit 1009, gain controllers 1010, an adder 1011, and fraction interval delay circuits 1013. This embodiment also uses the three antennas 1001 to 1003, but may alternatively use more than three antennas in any of the antenna arrangements, as discussed in the above first to sixth embodiments.

In operation, an uplink signal from a mobile station is received by the antennas 1001 to 1003 and then supplied to the fractional spaced decision feedback equalizer 1005 through the signal separating circuit 1004. In the fractional spaced decision feedback equalizer 1005, signals received by the antennas 1001 to 1003 are delayed by the fraction interval delay circuits 1013, and the output from the discriminator 1012 is delayed by the symbol interval delay circuit 1009. The outputs from the fraction interval delay circuits 1013 and the symbol interval delay circuit 1009 are weighted by the gain controllers 1010 and then added by the adder 1011 to eliminate the intersymbol interference. The output of the adder 1011 is supplied to the network 1008 through the discriminator 1012 and the baseband circuit 1007.

The fractional spaced decision feedback equalizer 1005, as is well known in the art, adjusts intervals between feedforward taps to a fraction of a symbol cycle to eliminate errors or shifts in sampling timing.

A downlink signal from the network 1008 is inputted to the modulator/amplifier 1006 through the baseband circuit 1007 and then radiated from the antennas 1001 to 1003 through the signal separating circuit 1004.

Figure 13:
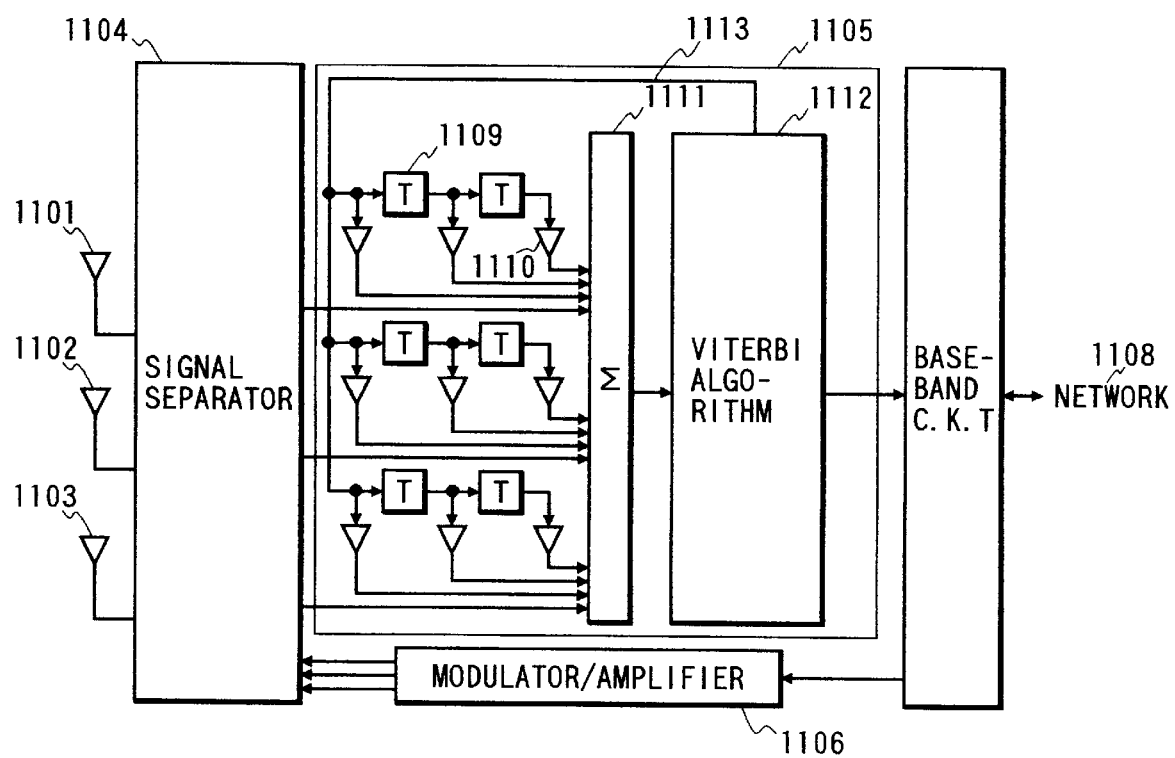
FIG. 13 is a circuit diagram which shows a base station according to the twelfth embodiment of the invention.

FIG. 13 shows a circuit structure of a base station according to the twelfth embodiment of the invention.

The base station includes an signal separating circuit 1104, a maximum likelihood decoder 1105 using the MLSE (maximum likelihood sequence estimation) technique, a baseband circuit 1107, and a modulator/amplifier 1106. The signal separating circuit 1104 separates input signals into received signals and transmitting signals and supplies the received signals to the maximum likelihood decoder 1105 and the transmitting signals to antennas 1101, 1102, and 1103. The maximum likelihood decoder 1105 includes symbol interval delay circuits 1109, gain controllers 1110, an adder 1111, and a viterbi algorithm arithmetic circuit 1112. This embodiment also uses the three antennas 1101 to 1103, but may alternatively use more than three antennas in any of the antenna arrangements, as discussed in the above first to sixth embodiments.

In operation, an uplink signal from a mobile station is received by the antennas 1101 to 1103 and then supplied to the maximum likelihood decoder 1105 through the signal separating circuit 1104. The maximum likelihood decoder 1105 provides candidate data 1113 through the viterbi algorithm arithmetic circuit 1112 and subtracts a replica of the candidate data 1113 from signals received by the antennas 1101 to 1103, respectively, to determine differences therebetween. If these differences are small, it is determined that the candidate data 1113 is correct, so that it is used as a branch metric in the viterbi algorithm arithmetic circuit 1112 to compensate for the intersymbol interference for improvement in quality of the received signals. The output from the viterbi algorithm arithmetic circuit 1112 is demodulated by the baseband circuit 1107 and then transmitted to the network 1108.

A downlink signal from the network 1108 is inputted to the modulator/amplifier 1106 through the baseband circuit 1107 and then radiated from the antennas 1101 to 1103 through the signal separating circuit 1104.

Figure 14:
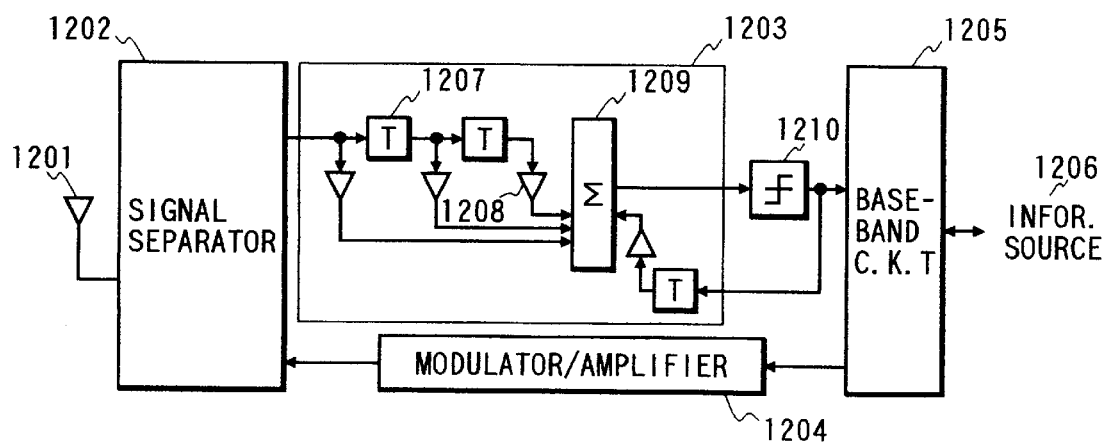
FIG. 14 is a circuit diagram which shows a mobile station according to the thirteenth embodiment of the invention.

FIG. 14 shows a circuit structure of a mobile station according to the thirteenth embodiment of the invention which may be used with any of the mobile communication systems in the above first to twelfth embodiments.

The mobile station includes an signal separating circuit 1202, a decision feedback equalizer 1203, a discriminator 1210, a baseband circuit 1205, and a modulator/amplifier 1204. The signal separating circuit 1202 separates input signals into a received signal and a transmitting signal and supplies the received signal to the decision feedback equalizer 1203 and the transmitting signal to an antenna 1201. The decision feedback equalizer 1203 includes symbol interval delay circuits 1207, gain controllers 1208, and an adder 1209.

In operation, an downlink signal from a base station is received by the antenna 1201 then supplied to the decision feedback equalizer 1203 through the signal separating circuit 1202. In the decision feedback equalizer 1203, the received signal and an output of the discriminator 1210 are delayed by the symbol interval delay circuits 1207, weighted by the gain controllers 1208, and then added by the adder 1209 to remove the intersymbol interference caused by the difference in distance between antennas of the base station and/or a delayed wave produced by diffraction or reflection of a radio signal on buildings or mountains. The output from the adder 1209 is discriminated by the discriminator 1210, demodulated by the baseband circuit 1205, and then supplied to an information source 1206.

An uplink signal from the information source 1206 is inputted to the modulator/amplifier 1204 through the baseband circuit 1205 and then radiated from the antenna 1201 through the signal separating circuit 1202.

Figure 15:
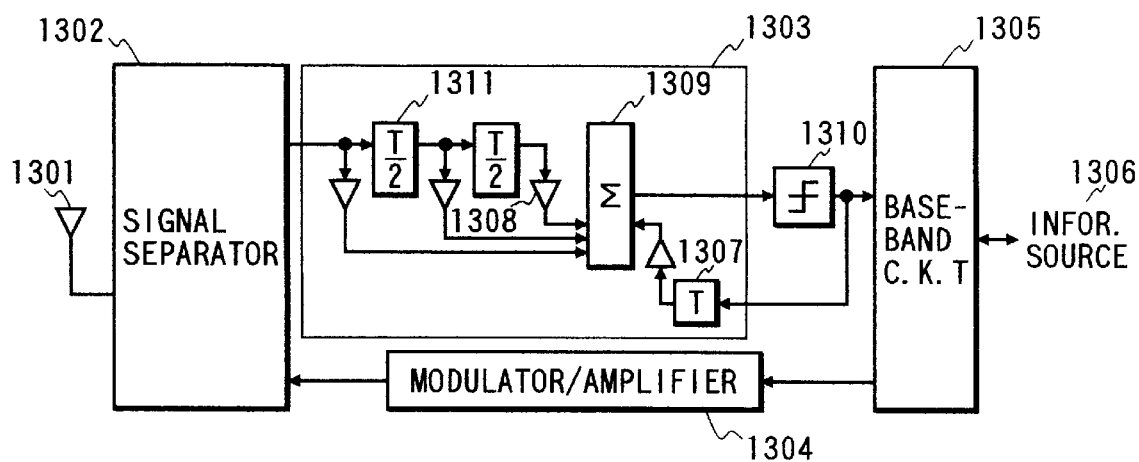
FIG. 15 is a circuit diagram which shows a mobile station according to the fourteenth embodiment of the invention.

FIG. 15 shows a circuit structure of a mobile station according to the fourteenth embodiment of the invention which may be used with any of the mobile communication systems in the above first to twelfth embodiments.

The mobile station includes an signal separating circuit 1301, a fractional spaced decision feedback equalizer 1303, a discriminator 1310, a baseband circuit 1305, and a modulator/amplifier 1304. The signal separating circuit 1302 separates input signals into a received signal and a transmitting signal and supplies the received signal to the fractional spaced decision feedback equalizer 1303 and the transmitting signal to an antenna 1301. The fractional spaced decision feedback equalizer 1303 includes a symbol interval delay circuit 1307, gain controllers 1308, an adder 1309, and fraction interval delay circuits 1311.

In operation, a downlink signal from a base station is received by the antenna 1301 and then supplied to the fractional spaced decision feedback equalizer 1303 through the signal separating circuit 1302. In the fractional spaced decision feedback equalizer 1303, the signal received by the antennas 1301 is delayed by the fraction interval delay circuits 1311, and the output from the discriminator 1310 is delayed by the symbol interval delay circuit 1307. The outputs from the fraction interval delay circuits 11311 and the symbol interval delay circuit 1307 are weighted by the gain controllers 1308 and then added by the adder 1309 to eliminate the intersymbol interference. The output of the adder 1309 is supplied to the baseband circuit 1305 through the discriminator 1310 and then demodulated therein, after which it is supplied to the information source 1306.

The fractional spaced decision feedback equalizer 1303, as discussed in the above embodiments, adjusts intervals between feedforward taps to a fraction of a symbol cycle to eliminate errors or shifts in sampling timing.

An uplink signal from the information source 1306 is inputted to the modulator/amplifier 1304 through the baseband circuit 1305 and then modulated therein. The output of the modulator/amplifier 1304 is supplied to the antenna 1301 through the signal separating circuit 1302.

Figure 16:
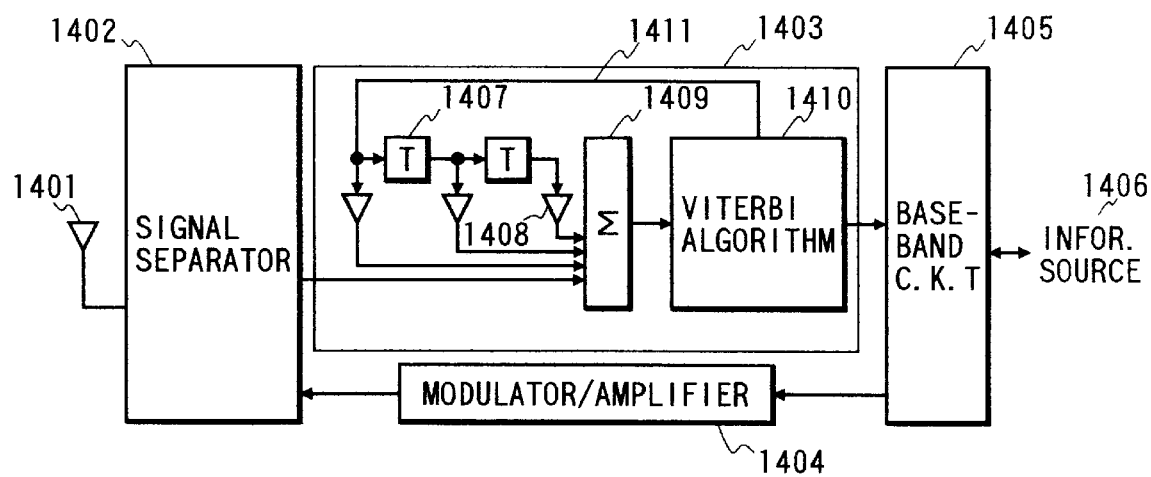
FIG. 16 is a circuit diagram which shows a mobile station according to the fifteenth embodiment of the invention.

FIG. 16 shows a circuit structure of a mobile station according to the fifteenth embodiment of the invention which may be used with any of the mobile communication systems in the above first to twelfth embodiments.

The mobile station includes an signal separating circuit 1402, a maximum likelihood decoder 1403 using the MLSE (maximum likelihood sequence estimation) technique, a baseband circuit 1405, and a modulator/amplifier 1404.

The signal separating circuit 1402 separates input signals into a received signal and a transmitting signals and supplies the received signal to the maximum likelihood decoder 1403 and the transmitting signal to an antennas 1401. The maximum likelihood decoder 1403 includes symbol interval delay circuits 1407, gain controllers 1408, an adder 1409, and a viterbi algorithm arithmetic circuit 1410.

In operation, a downlink signal from a base station is received by the antenna 1401 and then supplied to the maximum likelihood decoder 1403 through the signal separating circuit 1402. The maximum likelihood decoder 1403 provides candidate data 1411 through the viterbi algorithm arithmetic circuit 1410 and subtracts a replica of the candidate data 1411 from the received signal to determine the difference therebetween. If this difference is small, it is determined that the candidate data 1411 is correct, so that it is used as a branch metric in the viterbi algorithm arithmetic circuit 1410 to compensate for the intersymbol interference for improvement in quality of the received signals. The output from the viterbi algorithm arithmetic circuit 1403 is demodulated by the baseband circuit 1405 and then transmitted to the information source 1406.

An uplink signal from the information source 1406 is inputted to the modulator/amplifier 1404 through the baseband circuit 1405 and then radiated from the antenna 1401 through the signal separating circuit 1402.

Figure 17:
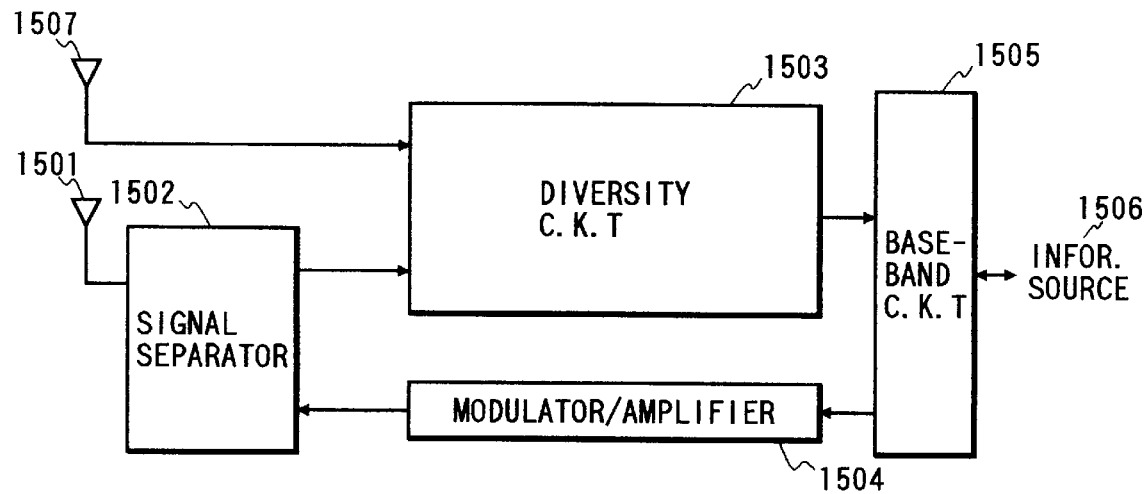
FIG. 17 is a circuit diagram which shows a mobile station according to the sixteenth embodiment of the invention.

FIG. 17 shows a circuit structure of a mobile station according to the sixteenth embodiment of the invention which may be used with any of the mobile communication systems in the above first to twelfth embodiments.

The mobile station includes an signal separating circuit 1502, a diversity circuit 1503, a baseband circuit 1505, a modulator/amplifier 1504, and antennas 1507 and 1501. The signal separating circuit 1502 separates input signals into a received signal and a transmitting signal and supplies the received signal to the diversity circuit 1503 and the transmitting signal to an antenna 1501.

In operation, a downlink signal from a base station is received by the antennas 1501 and 1507. The signal received by the antenna 1507 is supplied directly to the diversity circuit 1503, while the signal received by the antenna 1501 is supplied to the diversity circuit 1503 through the signal separating circuit 1502. The diversity circuit 1503 includes an equalizer or a maximum likelihood decoder, as described in the above thirteenth to fifteenth embodiments, and handles the two received signals using a known diversity technique such as a selection/combination, an equal-gain combination, or a maximal-gain combination technique, as already described, to provide a resultant signal to the baseband circuit 1505 so that it is demodulated. The demodulated signal is then supplied to the information source 1506.

An uplink signal from the information source 1506 is inputted to the modulator/amplifier 1504 through the baseband circuit 1505 and then radiated from the antenna 1501 through the signal separating circuit 1502.

In this embodiment, the processing of the signals received by the two antennas 1507 and 1501 using the diversity technique compensates for deterioration in radio reception quality due to a variation in received signal level caused by the effects of fading.

Figure 18:
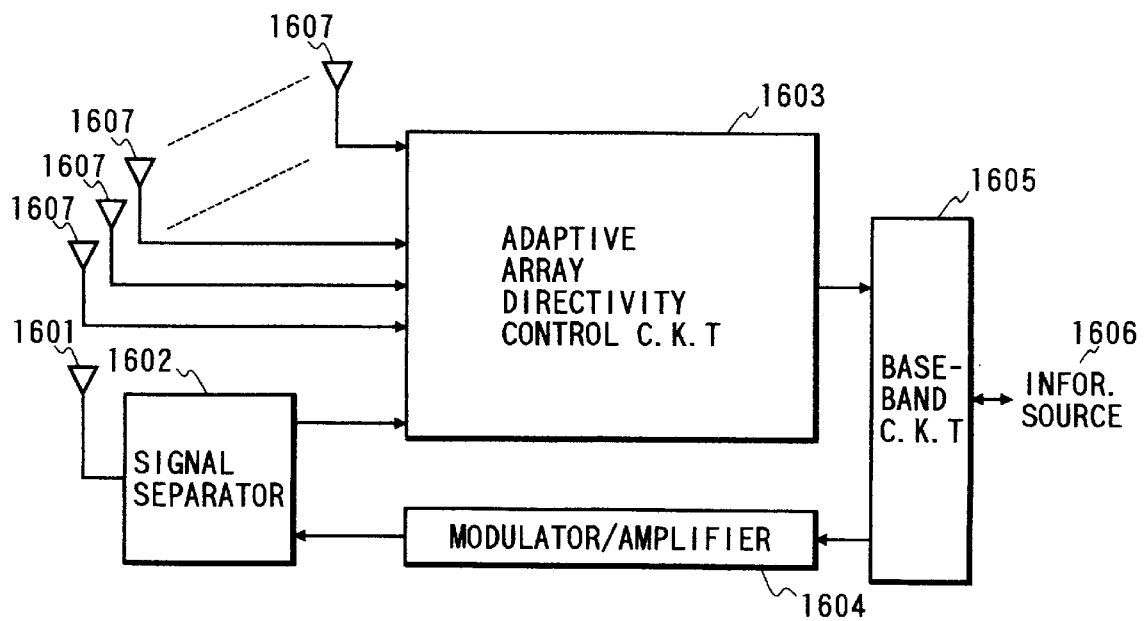
FIG. 18 is a circuit diagram which shows a mobile station according to the seventeenth embodiment of the invention.

FIG. 18 shows a circuit structure of a mobile station according to the seventeenth embodiment of the invention which may be used with any of the mobile communication systems in the above first to twelfth embodiments.

The mobile station includes an adaptive array of antennas 1607 connected directly to an adaptive array directivity control circuit 1603, an antenna 1601 connected to the adaptive array directivity control circuit 1603 and a modulator/amplifier 1604 through an signal separating circuit 1602, and a baseband circuit 1605 connected to an information source 1606. The signal separating circuit 1602 separates input signals into a received signal and a transmitting signal and supplies the received signal to the adaptive array directivity control circuit 1603 and the transmitting signal to an antenna 1601.

In operation, a downlink signal from a base station is received by the adaptive array of antennas 1607 and the antenna 1601. These antennas are arranged to have a given correlation among them. Signals received by the antennas 1607 are supplied directly to the adaptive array directivity control circuit 1603, while a signal received by the antenna 1601 is supplied to the adaptive array directivity control circuit 1603 through the signal separating circuit 1602. The adaptive array directivity control circuit 1603 performs the so-called directivity control to decrease antenna gains of some of the antennas 1607 to 1601 oriented to directions in which unwanted waves would arrive and provides an optimum resultant signal to the baseband circuit 1605. The baseband circuit 1605 demodulates the input signal and supplies it to the information source 1606.

An uplink signal from the information source 1606 is inputted to the modulator/amplifier 1604 through the baseband circuit 1605 and then radiated from the antenna 1601 through the signal separating circuit 1602.

In this embodiment, the use of the adaptive array directivity control circuit 1603 minimizes the co-channel interference and the effects of delayed waves. The adaptive array directivity control circuit 1603 may use an equalizer or a maximum likelihood decoder, as described in the above thirteenth to fifteenth embodiments, for further improvement in radio reception quality.

Figure 19:
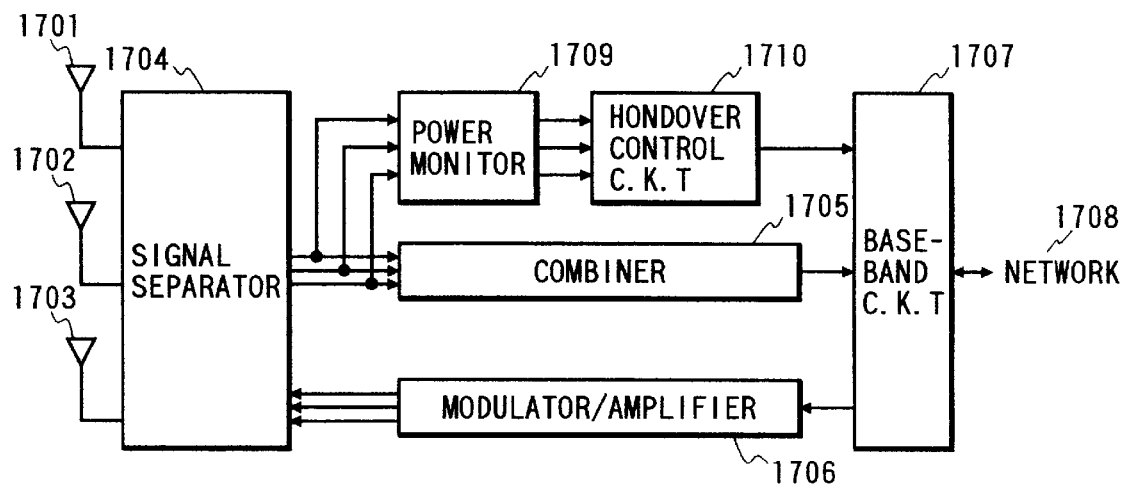
FIG. 19 is a circuit diagram which shows a base station according to the eighteenth embodiment of the invention.

FIG. 19 shows a circuit structure of a base station according to the eighteenth embodiment of the invention which uses three antennas 1701, 1702, and 1703, but may alternatively use more than three antennas in any of the antenna arrangements, as discussed in the above first to sixth embodiments.

The base station includes an signal separating circuit 1704, a power monitor 1709, a handover control circuit 1710, a combiner 1705, a modulator/amplifier 1706, and a baseband circuit 1707. The signal separating circuit 1702 separates input signals into signals received by antennas 1701, 1702, and 1703 and transmitting signals inputted from the modulator/amplifier 1706 and supplies the received signals to the power monitor 1709 and the combiner 1705 and the transmitting signals to the antennas 1701 to 1703.

In operation, an uplink signal from a mobile station is received by the antennas 1701 to 1703. These received signal are supplied through the signal separating circuit 1704 to the power monitor 1709 and the diversity circuit 1705. The combiner 1705 performs a diversity operation, as described in any of the seventh to twelfth embodiments, on the input signals to provide an optimum resultant signal to the baseband circuit 1707. The power monitor 1709 measures the levels of the signals received by the antennas 1701 to 1703 to determine the position and direction of the mobile station using the predetermined geographically locational relation among the antennas 1701 to 1703. The handover control circuit 1710 determines whether the handover should be performed or not. For example, when the mobile station is lying on the periphery of the cell, the handover control circuit 1710 determines that a communication channel now in service should be switched over to that of another cell and also specifies a cell to which the communication channel is handed over. The handover control circuit 1701 then adds a handover control signal including such information to a control signal contained in a transmitting signal through the baseband circuit 1707 and transmits it to the mobile station. In a conventional system, determination of a cell to which a communication channel is handed over is made by monitoring signals radiated from adjacent cells, however, the use of the system of this embodiment reduces the burden on a mobile station, thereby allowing the size, production costs, and power requirements of mobile stations to be reduced.

A downlink signal from the information source 1708 is inputted to the modulator/amplifier 1706 through the baseband circuit 1707. The modulator/amplifier 1706 modulates the input signal and provides modulated signals to the antennas 1701 to 1703 through the signal separating circuit 1704.

Figure 20:
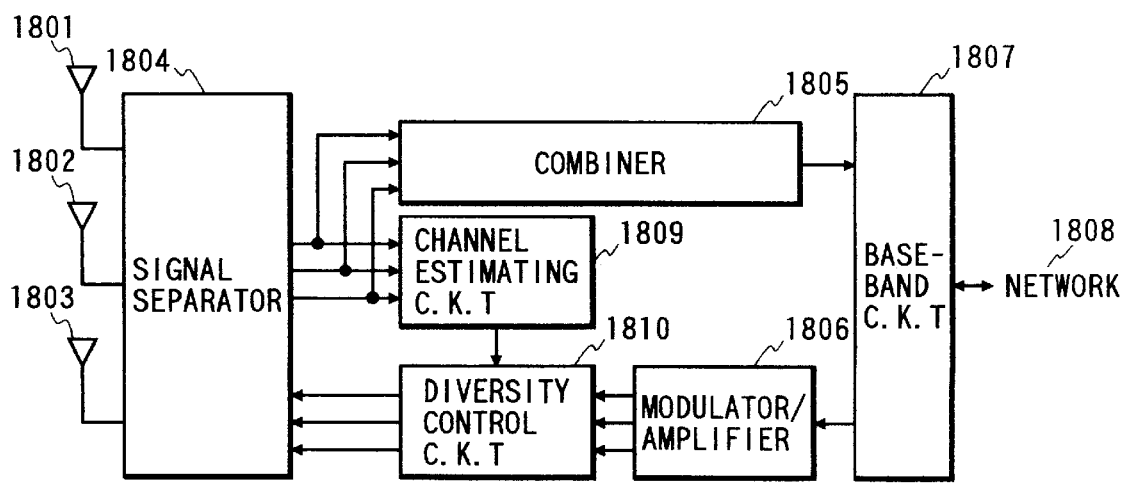
FIG. 20 is a circuit diagram which shows a base station according to the nineteenth embodiment of the invention.
Figure 21:
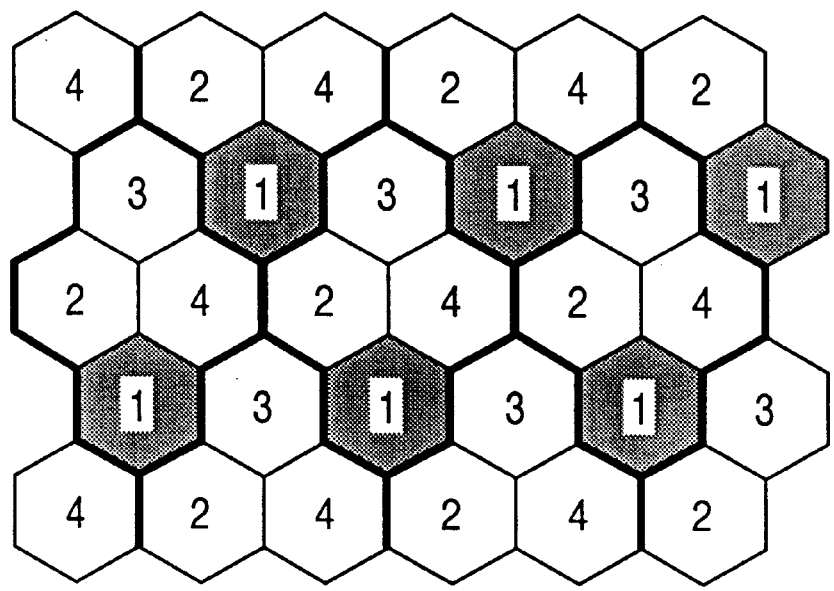
FIG. 21 is a schematic diagram which illustrates a conventional 4-cell reuse pattern.
Figure 22:
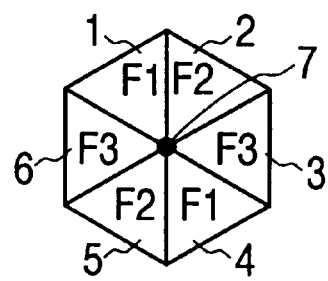
FIG. 22 is a schematic diagram which illustrates a conventional frequency reuse pattern.

FIG. 20 shows a circuit structure of a base station according to the nineteenth embodiment of the invention which uses three antennas 1801, 1802, and 1803, but may alternatively use more than three antennas in any of the antenna arrangements, as discussed in the above first to sixth embodiments.

The base station includes an signal separating circuit 1804, a combiner 1805, a channel estimating circuit 1809, a transmission diversity control circuit 1810, a modulator/amplifier 1806, and a baseband circuit 1807. The signal separating circuit 1804 separates input signals into signals received by antennas 1801, 1802, and 1803 and signals to be transmitted from the antennas 1801 to 1803 and supplies the received signals to the combiner 1805 and the channel estimating circuit 1809 and the transmitting signals to the antennas 1801, 1802, and 1803.

In operation, an uplink signal from a mobile station is received by the antennas 1801 to 1803. These received signal are supplied through the signal separating circuit 1804 to the channel estimating circuit 1809 and the combiner 1805. The combiner 1805 performs a diversity operation, as described in any of the seventh to twelfth embodiments, on the input signals from the signal separating circuit 1804 to provide an optimum resultant signal to the baseband circuit 1807. The baseband circuit 1807 demodulates the input signal and provides it to the network 1808. The channel estimating circuit 1809 estimates line or channel states of the signals received by the antennas 1801 to 1803. In a TDD (Time Division Duplex) system which transmits and receives downlink and uplink signals at the same frequency, uplink and downlink channel states are substantially the same. The high-quality radio reception without signal distortion in a mobile station is, thus, achieved by adding a revere characteristic to an estimated channel state to a transmission signal. Specifically, the transmission diversity control circuit 1810 adds reverse characteristics to the channel states estimated by the channel estimating circuit 1809 to transmission signals which are derived by modulating through the modulator/amplifier 1806 a downlink signal inputted from the network 1808 through the baseband circuit 1807 and which are supplied to the antennas 1801 to 1803 through the signal separating circuit 1804. Usually, if the channel distortion is great, it is necessary to install a circuit such as an equalizer in a mobile station for minimizing the channel distortion, however, this embodiment minimizes the channel distortion at the base station, thereby reducing the load acting on the mobile station.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A mobile communication system comprising:
    a base station; and
    a plurality of antennas connected to the base station, said antennas being located on a periphery of a cell and having directional characteristics oriented toward the center of the cell,
    wherein said base station has a decision feedback equalizer which removes components inducing co-channel interference from signal received by the antennas,
    and wherein a tap interval of said decision feedback equalizer is set to a fraction of a symbol cycle for minimizing effects caused by a difference in arrival time of the signals at the antennas.

2. A mobile communication system comprising:
    a base station; and
    a plurality of antennas connected to the base station, said antennas being located on a periphery of a cell and having directional characteristics oriented toward the center of the cell,
    wherein said base station has a decoder which performs a maximum likelihood sequence estimation to minimize distortion caused by a difference in arrival time of the signals at the antennas.

3. A mobile communication system comprising:
    a base station; and
    a plurality of antennas connected to the base station, said antennas being located on a periphery of a cell and having directional characteristics oriented toward the center of the cell, further comprising a mobile station which has a decision feedback equalizer.

4. A mobile communication system as set forth in claim 3, wherein a tap interval of said decision feedback equalizer of the mobile station is set to a fraction of a symbol cycle for minimizing effects caused by a difference in arrival time of signals from the antennas at the mobile station.

5. A mobile communication system comprising:
    a base station; and
    a plurality of antennas connected to the base station, said antennas being located on a periphery of a cell and having directional characteristics oriented toward the center of the cell,
    further comprising a mobile station which has a decoder designed to perform a maximum likelihood sequence estimation to minimize distortion caused by a difference in arrival time of the signals from the antennas at the mobile station.

6. A mobile communication system comprising:
    a base station; and
    a plurality of antennas connected to the base station, said antennas being located on a periphery of a cell and having directional characteristics oriented toward the center of the cell,
    further comprising a mobile station which has a plurality of antennas and a diversity circuit performing a given diversity operation on signals received by the antennas.

7. A mobile communication system as set forth in claim 6, wherein said mobile station has a decision feedback equalizer and a decoder performing a maximum likelihood sequence estimation operation.

8. A mobile communication system comprising:
    a base station; and
    a plurality of antennas connected to the base station, said antennas being located on a periphery of a cell and having directional characteristics oriented toward the center of the cell,
    further comprising a mobile station having an adaptive array of antennas.

9. A mobile communication system as set forth in claim 8, wherein said mobile station has a decision feedback equalizer and a decoder performing a maximum likelihood sequence estimation operation.

10. A mobile communication system comprising:
    a base station; and
    a plurality of antennas connected to the base station, said antennas being located on a periphery of a cell and having directional characteristics oriented toward the center of the cell,
    wherein said base station includes a channel estimating circuit and a diversity circuit, the channel estimating circuit estimating a channel state by adjusting an uplink signal frequency and a downlink signal frequency to agree with each other, the diversity circuit adding reverse characteristics to the estimated channel state to a transmitting signal.

* * * * *